United States Patent Office 3,147,439
Patented Sept. 1, 1964

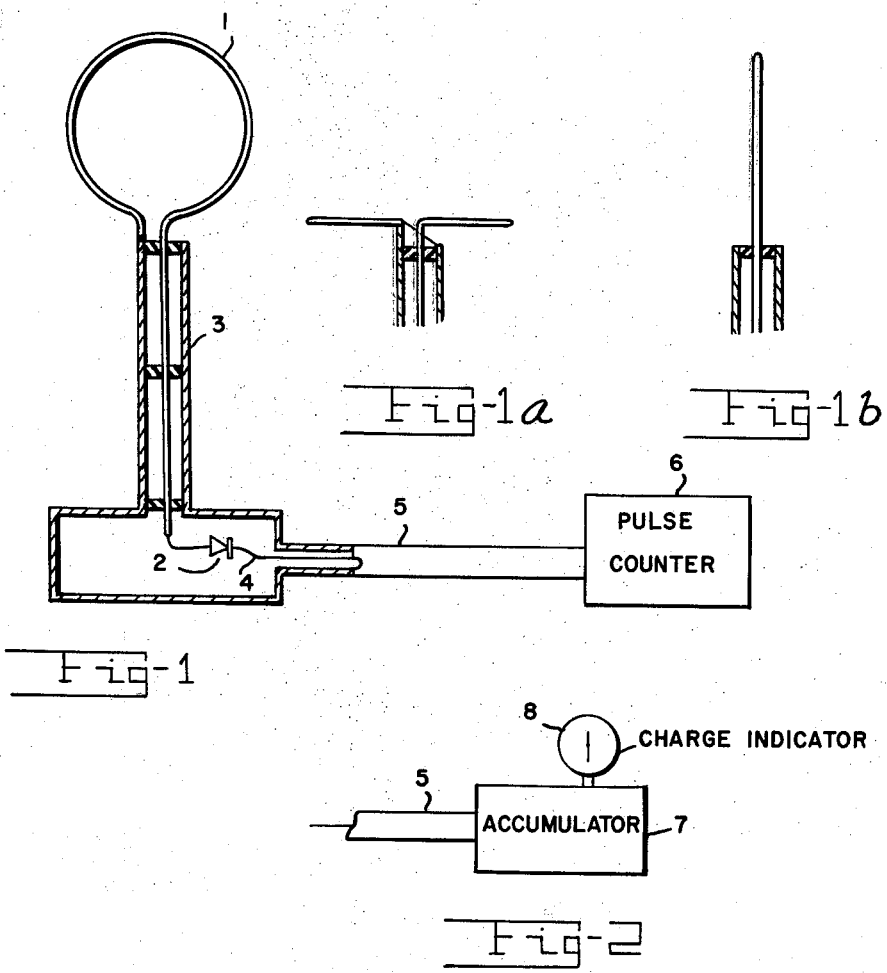

3,147,439
RADIO FREQUENCY DOSIMETER
Kenneth G. Eakin, 1113 Kellogg Ave., Utica, N.Y.
Filed Dec. 4, 1959, Ser. No. 857,474
4 Claims. (Cl. 325—364)
(Granted under Title 35, U.S. Code (1952), sec. 266)

The invention described herein may be manufactured and used by all for the Government for governmental purposes without the payment of any royalty thereon.

The purpose of this invention is to provide a device for indicating the total exposure suffered by a person to high level radio frequency energy. Persons working in the vicinity of powerful radio transmitters, especially those employing a directional antenna for concentrating the radiated energy in a beam, may sustain physical injury from overexposure to the high level of radiation present in the main beam. Hence, the need for a device to indicate the amount of high level radio frequency energy to which an individual has been subjected.

In accordance with the invention the above object is accomplished by rectifying the output of a small simple receiving antenna and applying the output of the rectifier to a pulse counter or an indicating charge accumulator. The counter is used for pulsed radiations such as employed in radar. Since the pulses in the main beam are all of substantially the same magnitude, a count of the total number of pulses received is proportional to the total amount of radiation received and therefore is a measure of the dosage received by an individual carrying the dosimeter. The indicating charge accumulator may be used with either pulsed or continuous radiations, the total charge accumulated being proportional to the dosage. The invention will be explained in more detail with reference to the accompanying drawings in which:

FIG. 1 is a schematic diagram of the dosimeter using a pulse counter;

FIGS. 1a and 1b show alternate antennas for use in FIG. 1; and

FIG. 2 illustrates the use of an indicating charge accumulator as the exposure indicator.

Referring to FIG. 1, a simple loop receiving antenna 1 feeds a crystal rectifier 2 through a suitable transmission line 3. The rectified output of rectifier 2 is fed over conductor 4 through shield 5 to pulse counter 6. When the energy is radiated in pulses, as in the case of radar transmitters, and when the intensity of the pulses is known, a count of the number of pulses received is a measure of the amount of radiation received. The intensity of the main beam pulses in the vicinity of the antenna is usually known or can be determined by field strength measurement. As stated above, it is the radiation in the main lobe of the antenna pattern that is dangerous. Since the dosimeter antenna is small and no amplification is used, as seen in FIG. 1, weak spurious radiation fields in the vicinity of the transmitter and antenna will not actuate the counter so that only the high level pulses radiated in the main lobe are counted. Thus the count is a direct measure of the total exposure of an individual to the high level radiation. The pulse counter may be of any known type such as a cascade of bistable circuits giving a binary count.

FIGS. 1a and 1b illustrate dipole and monopole antennas, respectively, that may be substituted for the loop in FIG. 1.

FIG. 2 illustrates a charge accumulator 7, having a charge indicator 8, used in place of the pulse counter 6 of FIG. 1. The accumulator may be of the chemical type such as a storage battery with the indicator 8 a device for indicating the specific gravity of the electrolyte and therefore the accumulation of charge. Indicating accumulators are known in the art and described in the literature, for example, in U.S. Patents Nos. 2,054,691, 2,072,553 and 2,325,251. Since the current flowing into the accumulator is proportional to the energy received by the antenna, the accumulation of charge is a measure of the exposure to radiation. Since the radiation intensity in the main lobe of the antenna is many times that in the side lobes or other spurious fields about the antenna and transmitter, the accumulated charge will be due principally to main lobe radiation and hence gives a close indication of the amount of high level radiation to which the individual has been subjected. The accumulator type of indicator is suitable for indicating continuous wave as well as pulsed energy.

I claim:

1. A radio frequency dosimeter consisting of a small receiving antenna, means coupled to said antenna for rectifying the radio frequency energy received by said antenna, and means coupled to said rectifying means and receiving the rectified energy therefrom for indicating the magnitude of the electric charge constituted by the total accumulation of said rectified energy.

2. A dosimeter for pulsed radio frequency energy consisting of a small receiving antenna, means coupled to said antenna for rectifying the pulsed radio frequency energy received by said antenna, and counting means coupled to said rectifying means and receiving the rectified pulses therefrom for providing a count of the total number of said rectified pulses.

3. A radio frequency dosimeter consisting of a small receiving antenna, means coupled to said antenna for rectifying the radio frequency energy received by said antenna, and an indicating electrical charge accumulator coupled to said rectifier and receiving the rectified energy therefrom for indicating the magnitude of the total accumulation of said rectified energy.

4. Apparatus as claimed in claim 3 in which said indicating electrical charge accumulator is a chemical electrical cell with means for indicating the specific gravity of the electrolyte.

References Cited in the file of this patent

UNITED STATES PATENTS

| 2,054,691 | Browne | Sept. 15, 1936 |
| 2,072,553 | Graves et al. | Mar. 2, 1937 |
| 2,325,251 | Knisely | July 27, 1943 |
| 2,586,091 | Rinia | Feb. 19, 1952 |
| 2,602,883 | Koontz et al. | July 8, 1952 |
| 2,852,668 | Trainer | Sept. 16, 1958 |
| 2,938,123 | Constable | May 24, 1960 |
| 2,945,179 | Winn | July 12, 1960 |

FOREIGN PATENTS

| 810,353 | Great Britain | Mar. 11, 1959 |
| 216,714 | Australia | Aug. 8, 1958 |

OTHER REFERENCES

Article, "Transistorized-Field Strength Meter," Radio and Television News, January 1956, pp. 43–45.